United States Patent [19]

Manning et al.

[11] 4,371,790

[45] Feb. 1, 1983

[54] FLUID MEASURING SYSTEM

[75] Inventors: John J. Manning; Robert E. Rosin, both of San Jose, Calif.; Ralph M. Richart, Tenafly, N.J.

[73] Assignee: RMR Systems, Inc., Santa Clara, Calif.

[21] Appl. No.: 188,929

[22] Filed: Sep. 19, 1980

[51] Int. Cl.³ .................... H01H 35/18; G01F 23/22
[52] U.S. Cl. ............................... 307/118; 73/304 R; 340/620; 361/178
[58] Field of Search .................. 73/304 R; 324/96; 340/620; 307/118

[56] References Cited

U.S. PATENT DOCUMENTS

| | | | |
|---|---|---|---|
| 3,552,209 | 1/1971 | Johnston | 73/304 R |
| 3,699,560 | 10/1972 | Meunier et al. | 73/861.56 X |
| 3,947,692 | 3/1976 | Payne | 73/304 R |
| 3,987,392 | 10/1976 | Kugelmann et al. | 324/96 |
| 4,004,220 | 1/1977 | Kerber et al. | 324/96 X |
| 4,149,149 | 4/1979 | Miki et al. | 324/96 X |
| 4,185,207 | 1/1980 | Bengtsson | 307/118 |
| 4,244,385 | 1/1981 | Hotine | 307/118 X |
| 4,256,985 | 3/1981 | Goodson et al. | 307/308 |

FOREIGN PATENT DOCUMENTS 1281163 10/1968 Fed. Rep. of Germany .... 73/304 R

Primary Examiner—Daniel M. Yasich
Attorney, Agent, or Firm—Hopgood, Calimafde, Kalil, Blaustein & Judlowe

[57] ABSTRACT

An apparatus for measuring the level, volume or rate of flow of an electrically conductive fluid, such as water, includes a reference conductor connected to a reference potential and a plurality of additional, vertically spaced conductors affixed to an insulating surface. The reference conductor is normally placed at the lowest point of the liquid container whereas the other conductors are positioned within the liquid container at various points above the reference conductor. When the level of the liquid is above the position of one or more of the additional conductors, the liquid effects an electrical conduction path between the conductors below the liqid level and the reference conductor and thus with the reference potential. The conductors are connected through a logic circuit to a plurality of display elements, which are selectively actuated to provide an indication of the level of the liquid corresponding to the uppermost conductor covered by the liquid and thereby connected to the reference potential.

2 Claims, 3 Drawing Figures

FLUID MEASURING SYSTEM

The present invention relates generally to measuring apparatus, and more particularly to an apparatus for measuring the level of a liquid with respect to a surface such as the wall of a container for the liquid. The level of a liquid will enable measurements to be made as to height, volume, or rate of flow.

A knowledge of the level of a liquid is necessary in a wide variety of applications. Typical environments for liquid-level-measuring systems include an automobile gasoline tank, a cooling water radiator, an oil tank, and a container for an acid. It is also desirable to determine the level of a fluid relative to a floating object such as in making a measurement of the depth of a cargo-laden boat in the water, which reflects the weight of the cargo carried by the boat.

The prime requirement of a liquid level-measuring system is accuracy, but other important requirements include safety, energy conservation, reliability, and economy. In the past, a liquid-level-measuring system which provided high accuracy of measurement was also often relatively complex, and in some cases in which the liquid was highly flammable, such as gasoline, the electrical portion of the measuring system itself created a possible hazard and risk of explosion. In addition, the conventional, reliable liquid-level-measuring systems tend to be high in cost, and are thus used only in those limited applications in which the need for accuracy justifies their cost. Conventional liquid-level-measuring systems also typically include one or more movable parts, such as a float and linkage, which are subject to wear and thus to failure or inaccuracy over periods of extended use. Electrical calibration is usually more accurate than mechanical calibration as more measuring reference points are possible.

It is an object of the present invention to provide a liquid-level measuring system which is accurate, reliable, safe in use, and low in cost.

It is another object of the present invention to provide a system of the type described which includes no moving parts and is low in cost.

It is another object of the invention to provide a liquid-level-measuring system of the type described which is electrical in nature, but in which the levels of current employed are of such a low level as not to create a hazard or risk of explosion, even when the system is used with a highly flammable liquid.

To these ends, the present invention provides an apparatus for measuring the level of a liquid which includes a reference conductor connected to a reference potential and a plurality of additional vertically spaced conductors affixed to an insulating surface. The reference conductor is normally placed at the lowest point of the liquid container whereas the other conductors are positioned at various points above the reference conductor within the liquid container. When the level of the liquid exceeds that of one or more of the additional spaced conductors, the liquid creates an electrical conduction path between the conductors below the liquid and the reference conductor and thus with the reference potential. The conductors are connected through a logic circuit to a plurality of display elements, which are selectively actuated in accordance with which of the conductors are connected to the reference potential, thereby to provide an indication of the level of the liquid as determined by the uppermost one of the conductors covered by the liquid.

To the accomplishment of the above and to such further objects as may hereinafter appear, the present invention relates to a fluid measuring system substantially as defined in the appended claims, and as described in the following specification as considered together with the following drawings in which:

Figure 1:
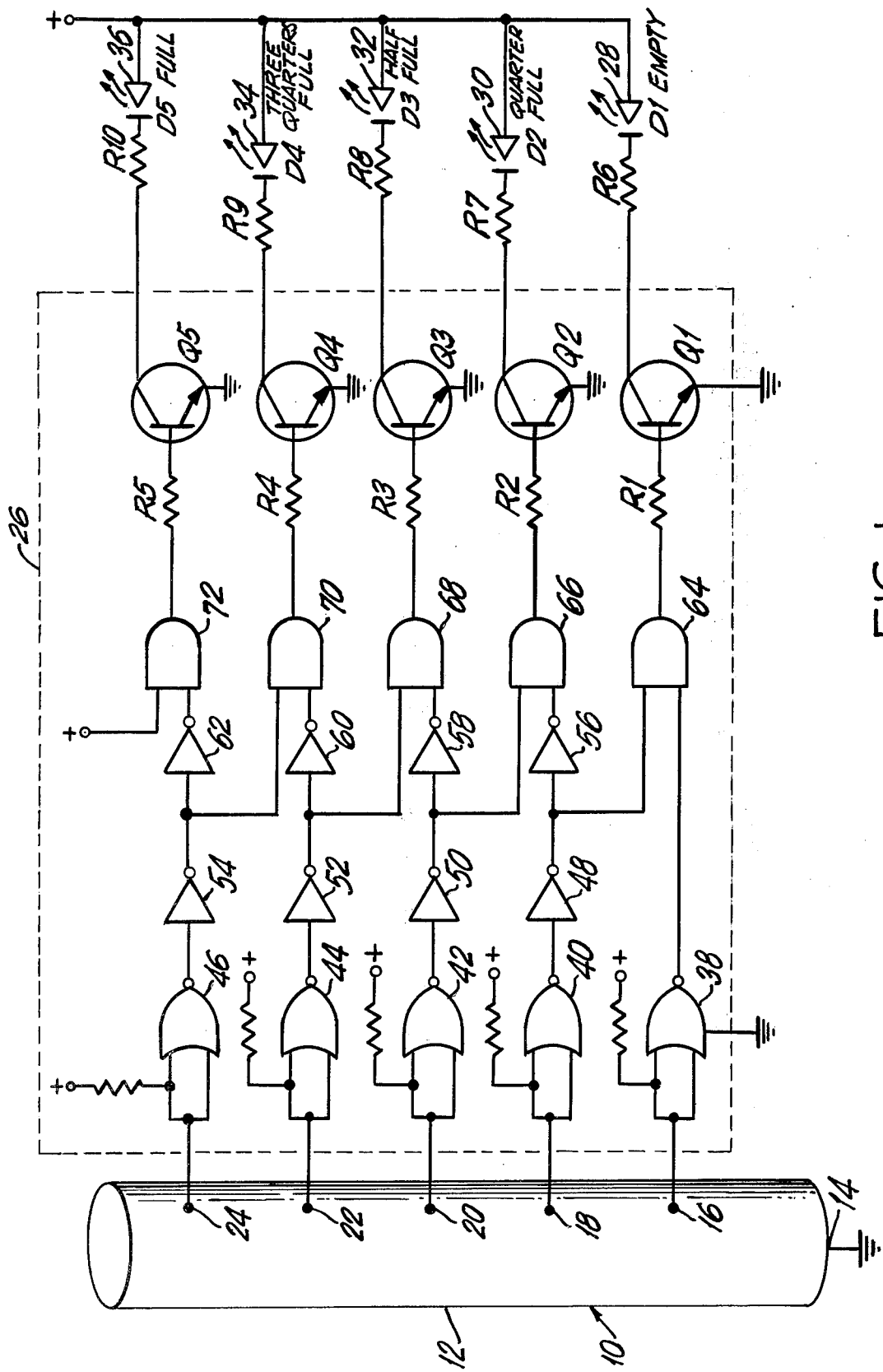
FIG. 1 is a schematic diagram of a liquid-level-measuring system in accordance with a first embodiment of the invention.

The apparatus of the invention, as in the embodiment schematically illustrated in FIG. 1, is designed to provide an indication of the level of an electrically conductive fluid or liquid medium 10 contained within a container 12. As an illustrative example of the invention, the fluid 10 may be oil stored in a cylindrical tank, which constitutes the container 12. A reference conducting element 14 is affixed to the lowermost point of container 12 and is connected to a reference potential, here ground. A plurality (here five) of sensors or additional conductors 16, 18, 20, 22 and 24 are attached to the inner surface of the container 12 and are normally (in the absence of liquid in the container above the level of sensor 16) electrically insulated from one another and from the reference conductor 14. The sensors 16–24 are preferably but not necessarily substantially equally spaced from one another and arranged along a common vertical axis. The spacing between the sensors and the number of sensors employed will depend on the precision of measurement desired of the height of the liquid in the container.

When the level of liquid 10 in the container 12 exceeds the level of one or more of the sensors, 16–24, each of the sensors below the upper level of the liquid will be electrically connected through the fluid medium 10 to all sensors below the liquid level and to the reference conductor 14.

For example, when the condition exists as shown in FIG. 1, in which the level of liquid 10 exceeds the vertical position of sensors 16 and 18, only those two sensors will be electrically connected through the liquid medium to each other and to the reference conductor 14 and thus, in this example, to ground. The remaining sensors, to wit, sensors 20, 22, and 24 are above the liquid, and remain electrically insulated from one another and from the other sensors and from reference conductor 14.

The sensors 16–24 are respectively connected through logic circuitry generally designated 26 to indicators, here shown as light-emitting diodes (LEDs) 28, 30, 32, 34 and 36. The logic circuit 26 supplies appropriate signals to selectively activate one of the LEDs depending on the level of the liquid 10 in the container 12 as determined by which, if any, of the sensors 16–24 is below the liquid. More specifically, sensors 16–24 are respectively connected to the inputs of CMOS NOR gates 38, 40, 42, 44, and 46. One of the inputs to each of the NOR gates 38–46 is also connected to a source of a positive voltage. The outputs of NOR gates 40–46 are respectively connected to the inputs of a plurality of CMOS inverters 48, 50, 52, and 54. The outputs of inverters 48-54 are, in turn, connected respectively to the inputs of inverters 56, 58, 60 and 62 and to one input of CMOS AND gates 64, 66, 68 and 70. The output of NOR gate 38 is applied directly to an input of AND gate 64, and the outputs of inverters 56, 58, 60 and 62 are respectively applied to the second inputs of AND gates 66, 68, 70 and 72. A second input of AND gate 72 is connected to a positive voltage source.

The outputs of AND gates 64-72 are respectively connected through resistors R1, R2, R3, R4, and R5 to the bases of NPN drive transistors Q1, Q2, Q3, Q4, and Q5. The emitter of each of the transistors is connected directly to ground, and the collectors of the transistors Q1-Q5 are connected respectively through resistors R6, R7, R8, R9, and R10 to the cathodes of LEDs D1, D2, D3, D4 and D5. The anodes of the LEDs are all connected in common and to a positive voltage source.

In the operation of the circuit of FIG. 1, when the level of liquid in the container is above that of sensors 16 and 18, as shown, those sensors are connected through the liquid to one another and to reference conductor 14, and thus to ground. The other sensors above the level of the liquid, namely sensors 20, 22, and 24, are not electrically connected by the liquid and thus remain at a potential above ground level.

Thus, a low or ground signal is applied from sensors 16 and 18 to the inputs of only NOR gates 38 and 40, respectively, each of which produces a high signal at its output. The high output of gate 38 is applied to one input of gate 64, and the high output of gate 40 is inverted by inverter 48 and again inverted by inverter 56, the output of which is applied to an input of AND gate 66.

Thus, under the condition corresponding to the liquid level shown in FIG. 1, AND gate 66 receives two high inputs, whereas AND gate 64, as well as the other AND gates 68, 70, and 72 receive a high and a low signal at their respective inputs. As a result, a high signal is applied to the base of only transistor Q2, which is rendered conductive, thereby to connect the cathode of LED D2 to ground, and thereby actuate this LED. The other LEDs remain isolated from ground and thus remain in their unactuated condition. Accordingly, only a single LED indicator, which corresponds to the uppermost sensor which is covered by, or below, the liquid will be activated to indicate, as in the condition in FIG. 1, that the tank is more than one-quarter full but less than one-half full of the liquid.

Figure 2:
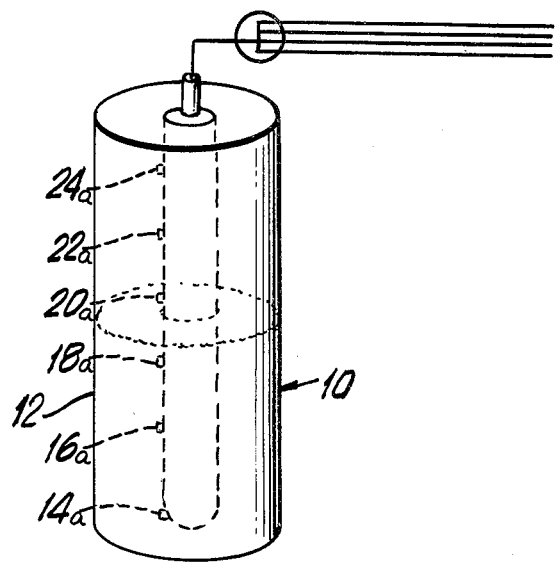
FIG. 2 is a partial schematic diagram of a level-measuring system in accordance with a second embodiment of the invention.
Figure 3:
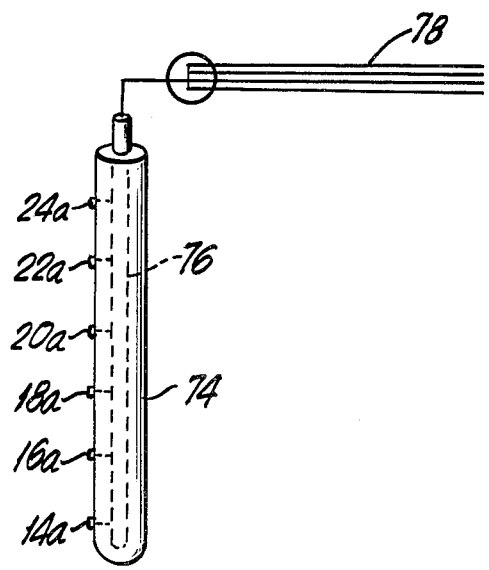
FIG. 3 is a schematic elevation view of the conductive sensors mounted on a carrier as employed in the embodiment of FIG. 2.

In the embodiment of the invention illustrated in FIGS. 2 and 3, a reference contact or conductor 14a and a plurality of vertically spaced and normally insulated sensors 16a, 18a, 20a, 22a and 24a are attached to an insulated rod or carrier 74, which is centrally and coaxially placed within the container 12 which contains a fluid 10 whose level is to be measured. The sensors 16a-24a are connected through wiring passing through an insulating sleeve 76 and outside of the container, as shown by the conductor 78, to logic circuitry and indicators of the type shown in FIG. 1 to provide an indication of the liquid level in the manner described above.

It will be appreciated that the liquid-level-measuring system of the invention is accurate and contains no mechanical moving parts. Moreover, the low currents that are generated in the portion of the system within the liquid container are sufficiently low to prevent any explosion of a flammable liquid, such as gasoline.

Although the embodiments of the invention herein specifically disclosed are designed to provide an indication of the level of a liquid, such as oil, within a cylindrical container, the invention may have many other uses, such as in swimming pools, radiators, washing machines, or any application in which it is desired to accurately measure the level, volume or rate of flow of a liquid in a container. The invention can also be used to indicate the weight of cargo in a ship by placing the sensors on the outer surface of a ship or vessel and determining the depth of the ship in the water by providing a visual or other indication of the uppermost sensor which is beneath the water. By the addition of suitable circuitry, the system of the present invention can be employed to advantage to provide an indication of the rate of fluid flow into or out of a container. The conductive sensors and conductors used in the system may be in the form of metal strips or metal dots affixed to a rod or tube, as shown in the embodiment of FIGS. 2 and 3, inserted into the container, or else may be in the form of stripes or dots of conductive paint applied to the inside surface of the container, as in the embodiment of FIG. 1.

Thus, although the present invention has been hereinabove disclosed with respect to a few embodiments, it will be apparent that modifications may be made therein without necessarily departing from the spirit and scope of the invention.

What is claimed is:

1. An apparatus for indicating the level of an electrically-conductive liquid, said apparatus comprising a carrier member, a reference contact attached to a reference position at substantially the lowermost part of said carrier member and connected to a reference potential, said carrier member being adapted to be placed in the liquid whose level is to be determined to an extent that at least said reference contact is below the surface of the liquid, a plurality of sensors attached to said carrier and positioned above said reference position of said reference contact, said sensors being vertically spaced on said carrier member and normally electrically insulated from one another and from said reference contact, the liquid into which said carrier member is placed being effective when the liquid extends between said reference position and the level of one or more of said sensors to effect electrical connection between said reference contact and said one or more of said sensors, thereby to operatively connect said one or more of said sensors to said first reference contact and thereby to said reference potential, a plurality of indicating means, and logic means interposed between said indicating means and said plurality of sensors and effective to selectively actuate at least the one of said indicating means which is operatively connected to the uppermost of said plurality of sensors that is below the surface of the liquid, said logic means comprising a plurality of switching means respectively connected to said indicating means and effective when it receives a drive signal to cause the actuation of the corresponding one of said indicating means, and a plurality of logic gates operatively respectively interposed between said plurality of sensors and said switching means and effective to provide a drive signal to a selected one of said switching means corresponding to the uppermost one of said plurality of sensors below the liquid.

2. The apparatus of claim 1, in which said logic means comprises means for actuating a selected one of said indicator means corresponding to the uppermost one of said sensors covered by the liquid and to inhibit the actuation of the other of said indicator means.

* * * * *